Figure 3:
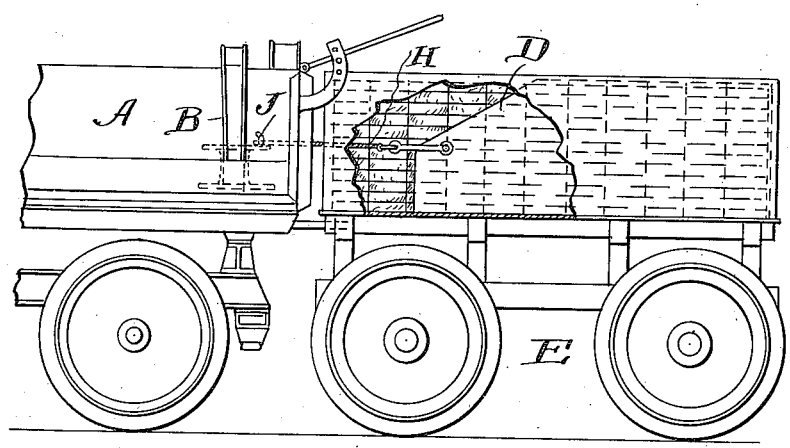

M. S. THOMPSON.
MOTOR TRUCK LOADING MECHANISM.
APPLICATION FILED JAN. 11, 1915.
1,247,034.
Patented Nov. 20, 1917.
2 SHEETS—SHEET 1.
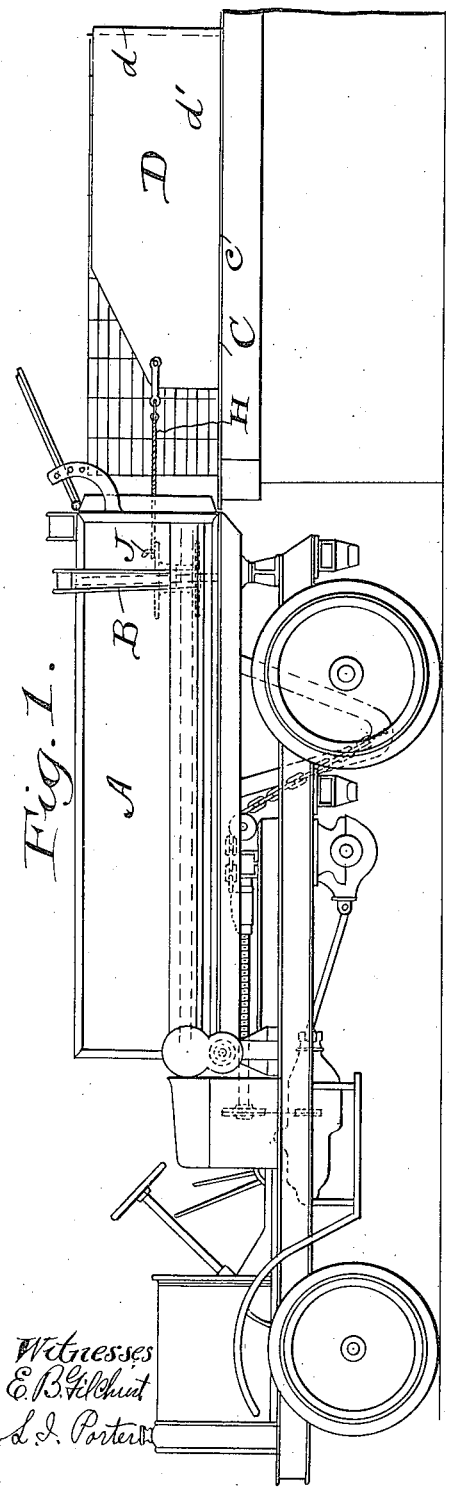
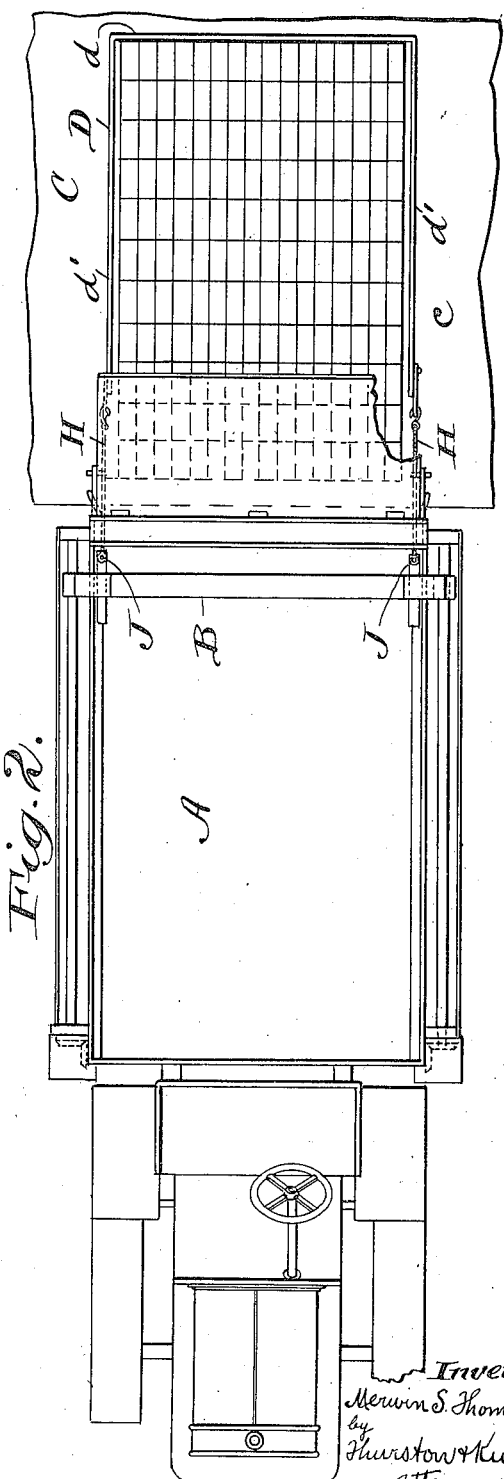

M. S. THOMPSON.
MOTOR TRUCK LOADING MECHANISM.
APPLICATION FILED JAN. 11, 1915.

1,247,034.

Patented Nov. 20, 1917.
2 SHEETS—SHEET 2.

UNITED STATES PATENT OFFICE.

MERWIN S. THOMPSON, OF PAINESVILLE, OHIO, ASSIGNOR, BY MESNE ASSIGNMENTS, TO THE WHITE MOTOR COMPANY, OF CLEVELAND, OHIO, A CORPORATION OF OHIO.

MOTOR-TRUCK-LOADING MECHANISM.

1,247,034.      Specification of Letters Patent.      Patented Nov. 20, 1917.

Application filed January 11, 1915. Serial No. 1,521.

*To all whom it may concern:*

Be it known that I, MERWIN S. THOMPSON, a citizen of the United States, residing at Painesville, in the county of Lake and State of Ohio, have invented a certain new and useful Improvement in Motor-Truck-Loading Mechanisms, of which the following is a full, clear, and exact description.

The objects of this invention are: First, to enable a motor truck to quickly load itself; second, to enable a motor truck to load a trailer which it is to haul; and, third, to enable a motor truck to unload its trailer.

The invention, as shown, is designed with particular reference to handling piles of brick or other articles which may be compactly piled,—but it may be used, although perhaps not as efficiently, for handling other materials, to effect some or all of the stated results.

The invention consists in the combination of parts shown in the drawing and hereinafter described and definitely pointed out in the appended claim.

Figure 4:
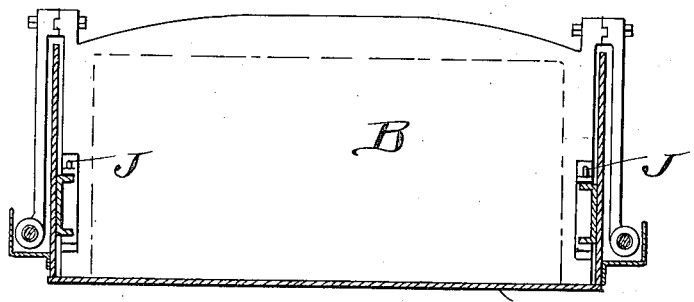

In the drawing Figure 1 is a side elevation of the invention in position for use to transfer a pile of bricks from a stationary platform to the truck body; Fig. 2 is a plan view of the part shown in Fig. 1; Fig. 3 is a side elevation of the rear part of a motor truck body and its trailer, showing the truck body and trailer in the relative positions they must occupy to enable a load to be drawn from a stationary platform into the trailer, or from the trailer into the truck body; Fig. 4 is a side elevation of the follower, which is a part of the truck shown in Fig. 1.

The invention is applicable for use with any dumping truck which is provided with a power shaft adapted to be driven by the truck motor, and means by which the power shaft may be utilized to haul the drag to be hereinafter referred to. The dumping truck shown is, however, substantially the same kind of a dumping truck which forms the subject matter of Letters Patent No. 1,131,489, granted March 9, 1915, to J. P. Dowd and myself.

Referring to the parts by letters, A represents the body of a motor truck. B represents the follower which extends across the body and occupies an approximately upright position therein. It is associated with means by which this follower may be forcibly moved backward to push a load out of the rear end of the body, or forward, to the front end of the body, to be ready for another unloading movement. The mechanism for causing the stated movements of said traveler may be substantially like those which are described in said prior application; or any other suitable mechanism may be employed for this purpose.

C represents a stationary platform, the top surface of which is in substantially the same horizontal plane as the bottom of the truck body A; and preferably it has a smooth metal top plate $c$. E represents a trailer adapted to be hauled by the truck. The bottom of the body C of the trailer should be in substantially the same horizontal plane as the bottom of the body of the truck. In so far as concerns the use of the present invention, the trailer may be regarded as the loading platform. Or, to put this in another way, the platform from which the load is transferred to the truck body may be a stationary platform C, or a movable platform consisting of the bottom of the body of a trailer.

D represents a drag. This may be made of strong sheet metal bent so as to form a vertical rear end $d$ of suitable height, and two parallel vertical sides $d'$ $d'$ which are at right angles to the rear end.

Two draft devices, preferably chains or cables H, are connected either permanently or temporarily, as desired, to the sides of the drag near the front end thereof. These chains or cables must be of suitable length. It is, therefore, preferable that chains be used, because any link of each chain may serve as the front end of the effective part of the chain.

Fixed to the rear side of the follower B, adjacent to each of the vertical edges thereof, is an upwardly directed hook J of such size that any link of the chain may go over it.

In using the described mechanism the following method may profitably be followed: A pile of bricks to be loaded either onto a trailer or into the truck body is formed on the stationary platform C, and this obviously may be done while the truck is making a journey to and from the discharging station. When the truck returns to the loading station it is backed up against the platform C. The drag has in the meantime been placed around the rear end of the pile of bricks, as shown. The follower in the truck, which was moved to the rear end of the truck body when the truck unloaded its previous load, is allowed to remain there while the truck is returning to the loading station. The two chains H are now slipped over the two hooks J on the follower, and the follower is moved, by the mechanism provided for that purpose, to the front end of the truck body, and thereby the drag is caused to push the entire pile of bricks into the truck body. This being accomplished, the chains are disengaged from the hooks J, and the drag pulled back onto the loading platform, and the truck is ready to proceed to the discharging station.

If the truck is provided with a trailer, this will be loaded before the truck is,— that is to say, the trailer will be backed up to the loading platform C, and the truck backed up against the front end of the trailer. In this event the chains will have to be of sufficient length to pass entirely through the trailer, so that they may engage the hooks J. This being accomplished, the pile of bricks is drawn into the trailer.

Then the trailer is drawn away, and the truck is backed up to the loading platform and another pile of bricks pulled into it by means of the drag.

When the truck and its trailer reach the discharging station, they will be detached, and the truck will first be unloaded by the mechanism provided for that purpose. Then the truck will back up to the trailer and by the use of the drag and chains the pile of bricks in the trailer will be pulled into the truck. Then the truck may be unloaded in the usual way.

It is obvious that much of the truck's useful time is saved at the loading station, for, instead of having to stand there while the bricks are being piled into it, the bricks will have been piled while the truck is going to and from the unloading station.

This invention makes it profitable to use trailers. The difficulty heretofore has been that when the trailers reached the unloading station they had to be unloaded by hand, and the truck had to stand idle until this has been accomplished. But, by the use of the described invention, the trailers may be loaded and unloaded mechanically, as above described, in a very short time, thereby greatly reducing the time lost by the truck waiting for the trailer or trailers to be unloaded.

Having thus described my invention, what I claim is:

The combination of a truck body having a bottom and sides and a door for closing the rear end of said body, which door is hinged to the sides of the body adjacent their and its upper edges whereby said door may be swung upward out of the way, a loading platform in approximately the same plane as said body, and a bottomless follower having a back and two sides which are separated a distance less than the distance between the two sides of the body whereby the follower may slide from said loading platform into said body and vice versa, and means connected with said follower by which it may be drawn from said loading platform into said body.

In testimony whereof, I hereunto affix my signature in the presence of two witnesses.

MERWIN S. THOMPSON.

Witnesses:
E. L. THURSTON,
A. J. HUDSON.